United States Patent [19]
Kozikaro et al.

[11] Patent Number: 5,402,365
[45] Date of Patent: Mar. 28, 1995

[54] DIFFERENTIAL ODOMETER DYNAMIC CALIBRATION METHOD AND APPARATUS THEREFOR

[75] Inventors: Elisha M. Kozikaro, Chicago; Martin D. Ives, Lake Zurich, both of Ill.

[73] Assignee: Motorola, Inc., Schaumburg, Ill.

[21] Appl. No.: 967,328

[22] Filed: Oct. 28, 1992

[51] Int. Cl.$^6$ ............................................... G01C 22/00
[52] U.S. Cl. ....................... 364/571.01; 364/424.01; 364/571.02; 364/561; 73/1 J; 73/1 R
[58] Field of Search ................. 364/424.01, 424.04, 364/449, 559, 560, 561, 565, 571.01, 571.02; 377/24; 73/1 R, 1 J, 2

[56] References Cited

U.S. PATENT DOCUMENTS

| | | | |
|---|---|---|---|
| 4,055,750 | 10/1977 | Jellinek | 364/424.02 |
| 4,663,719 | 5/1987 | Matsumoto et al. | 364/424.01 |
| 4,852,677 | 8/1989 | Okazaki | 364/424.01 |
| 5,020,008 | 5/1991 | Chambers et al. | 73/2 |
| 5,058,023 | 10/1991 | Kozikaro | 364/449 |
| 5,156,038 | 10/1992 | Kozikaro | 73/1 J |
| 5,179,526 | 1/1993 | Zimmer et al. | 364/565 |

FOREIGN PATENT DOCUMENTS 2009171  2/1990  Canada .

*Primary Examiner*—Gary Chin
*Attorney, Agent, or Firm*—Nicholas C. Hopman

[57] ABSTRACT

A differential odometer includes a left wheel sensor (503) coupled to a left wheel (103), and a right wheel sensor (513) coupled to a right wheel (105). The left wheel sensor (503) provides a left wheel pulse count (505) as the left wheel (103) rotates. A left wheel distance traversed is determined by a product of the left wheel pulse count and a left distance per pulse coefficient. The right wheel sensor (513) provides a right wheel pulse count (515) as the right wheel rotates. A right wheel distance traversed is determined by a product of the right wheel pulse count and a right distance per pulse coefficient. A vehicle heading (601'), and vehicle distance traversed (1201), are determined using the left wheel distance traversed and the right wheel distance traversed. A correction value (901, 1001) is provided corresponding to a measured relationship between the left wheel pulse count and the right wheel pulse count. Then a new left distance per pulse coefficient (1105), corresponding to the provided correction value (901, 1001), and a new right distance per pulse coefficient (1101), corresponding to the provided correction value (901, 1001) are provided. Then the left distance per pulse coefficient (605) is substituted with the new left distance per pulse coefficient (1105), and the right distance per pulse coefficient (609) with the new right distance per pulse coefficient (1101). This substitution causes calibration of the differential odometer, consistent with the provided correction value (901, 1001).

35 Claims, 4 Drawing Sheets

FIG.1
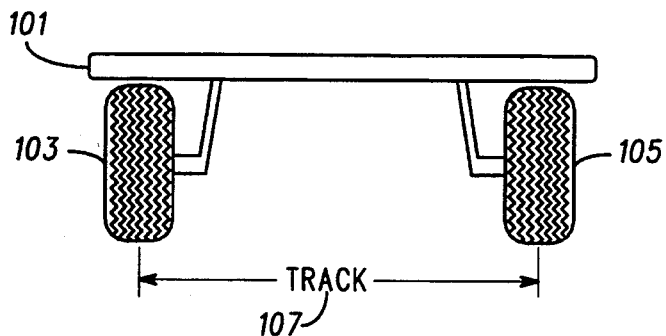
FIG.2
$$\Delta \text{HEADING} = \frac{\text{LEFT DISTANCE TRAVERSED} - \text{RIGHT DISTANCE TRAVERSED}}{\text{TRACK}}$$
FIG.3
$$\Delta \text{DISTANCE TRAVERSED} = \frac{\text{LEFT DISTANCE TRAVERSED} + \text{RIGHT DISTANCE TRAVERSED}}{2}$$
FIG.5
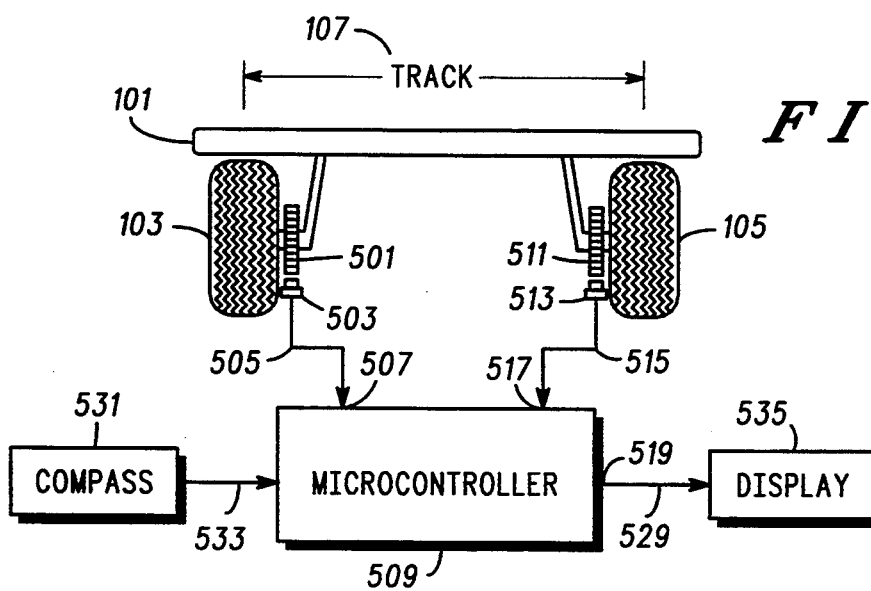

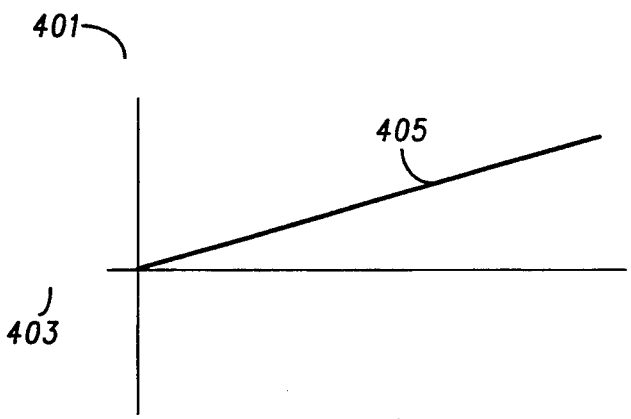
*FIG. 4*
*FIG. 6*
$$\overset{201'}{\triangle} \quad \underset{207}{\dfrac{\overset{603}{(Lcnt * Ldpp)} - \overset{607}{(Rcnt * Rdpp)}}{\underset{605}{\phantom{x}} \qquad \underset{609}{\phantom{x}}}}$$
*FIG. 7*
$$\underset{701}{Y(n)} = \left[ \underset{703}{Y(n-1)} * \left(1 - \underset{705}{\dfrac{\overset{603}{Lcnt}}{2,000}}\right) \right] + \dfrac{\overset{607}{Rcnt}}{2,000}$$
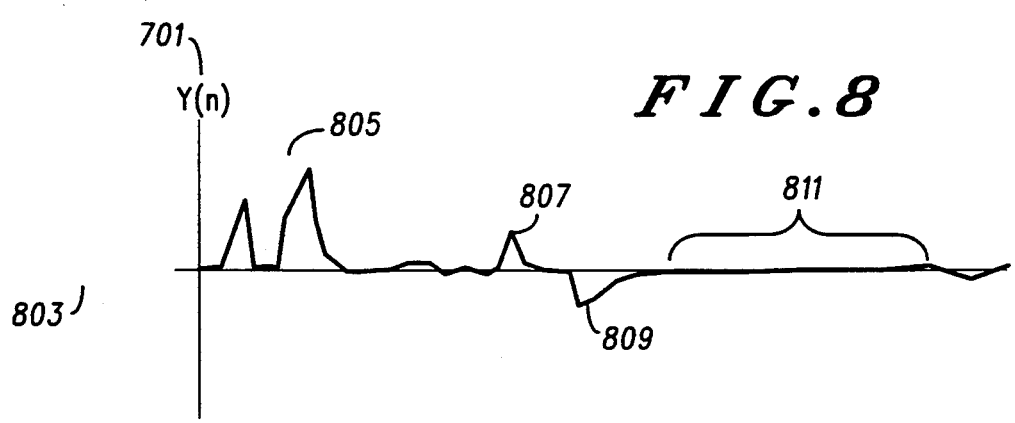
*FIG. 8*
*FIG. 9*
$$\underset{901}{FRC} = \underset{701}{Y(n)}$$

FIG.10

$$DRC = \underbrace{\left[\underbrace{Y(n)}_{701} - \left(\underbrace{\frac{Ldpp(old)}{Rdpp(old)}}_{609'}\right)\right]}_{1003} + \left(\underbrace{\frac{Ldpp(old)}{Rdpp(old)}}_{609'}\right)$$

$$\underbrace{\phantom{X}}_{1001}$$

FIG.11

$$\underbrace{Rdpp(new)}_{1101} = \underbrace{\dfrac{\left[\dfrac{Ldpp(old)}{FRC} + Rdpp(old)\right]}{2}}_{1003}$$

$$\underbrace{Ldpp(new) = Rdpp(new) * FRC}_{1105 \quad 1101'} \qquad \underbrace{\phantom{X}}_{901} \rightarrow \underbrace{Rdpp}_{609}$$

$$\underbrace{\phantom{X}}_{601'} \qquad = \underbrace{\dfrac{(Lcnt * Ldpp) - (Rcnt * Rdpp)}{TRACK}}_{603 \quad 605 \quad 607 \quad 207}$$

FIG.12

$$\underbrace{Rdpp(new)}_{1101} = \underbrace{\dfrac{\left[\dfrac{Ldpp(old)}{FRC} + Rdpp(old)\right]}{2}}_{1003} \rightarrow \underbrace{Rdpp}_{609}$$

$$\underbrace{Ldpp(new) = Rdpp(new) * FRC}_{1105 \quad 1101'} \qquad = \underbrace{\dfrac{(Lcnt * Ldpp) + (Rcnt * Rdpp)}{2}}_{603 \quad 605 \quad 607 \quad 303}$$

$$\underbrace{\phantom{X}}_{1201}$$

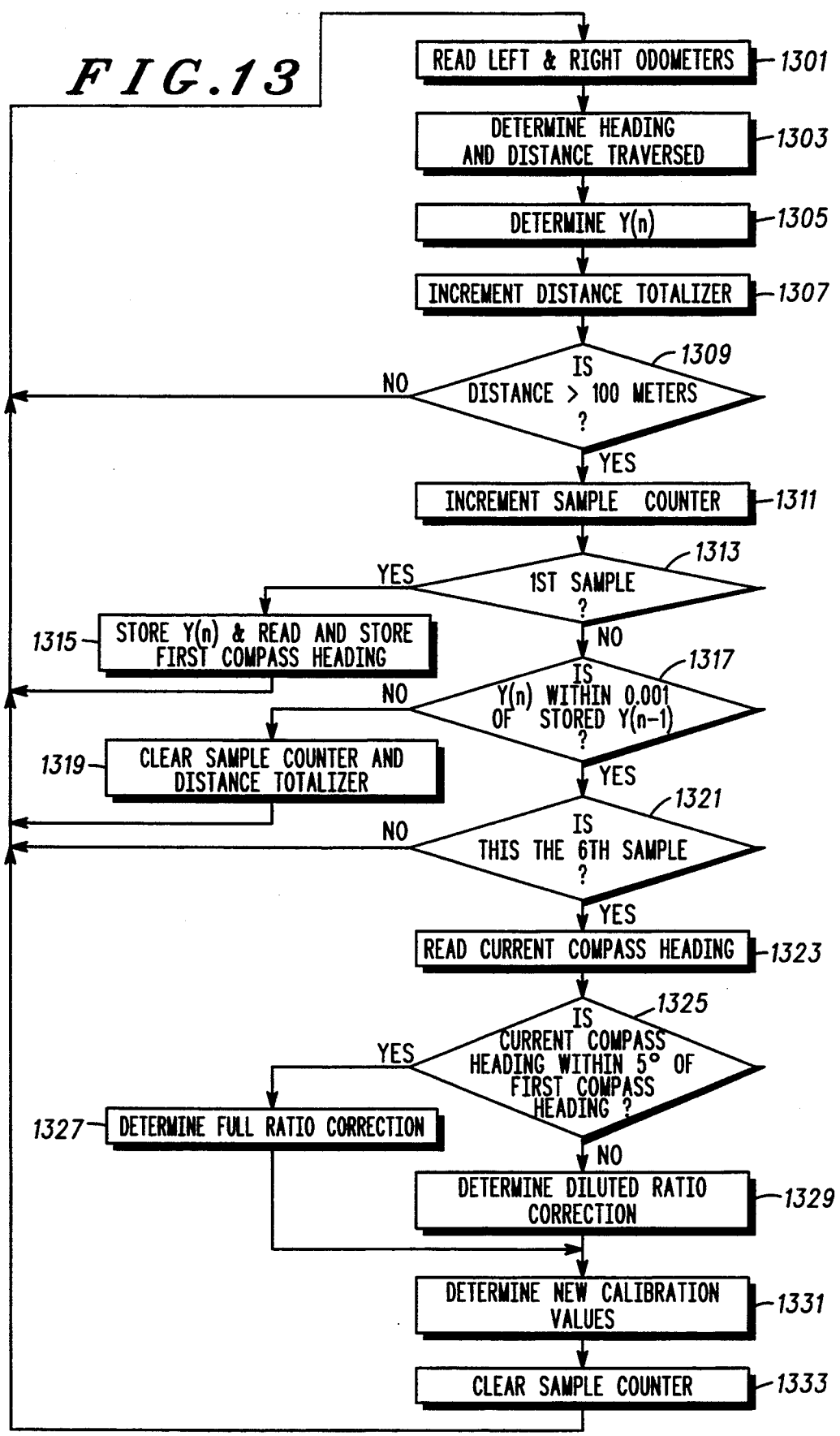

DIFFERENTIAL ODOMETER DYNAMIC CALIBRATION METHOD AND APPARATUS THEREFOR

FIELD OF THE INVENTION

This invention pertains to the field of vehicle navigation systems, and particularly to methods of calibrating differential odometers that are used in such systems for determining distance traversed and heading of a vehicle. The teachings of U.S. Pat. No. 5,058,023, Kozikaro, Elisha M. entitled VEHICLE POSITION DETERMINING APPARATUS are incorporated herein by reference.

BACKGROUND OF THE INVENTION

A typical differential odometer includes a complementary pair of sensors. Each of these are mounted near an opposing wheel of a vehicle. Typically these wheels are non-drive powered. For instance, in a front wheel drive vehicle, the sensors are mounted on the opposing left and right rear wheels. Each sensor generates a series of output pulses when the wheel, associated with the respective sensor, rotates. This series of output pulses is further processed by computation to determine vehicular distance traversed and heading, or differential distance traversed. Finally, with an absolute vehicle reference, a dead reckoned position for the vehicle can be determined.

The accuracy of information regarding vehicle heading is important in navigation systems because it effects the accuracy of the dead reckoned position. Because inaccuracies of the sensors are inherent, provision for calibrating these sensors is important. If calibrated accurately, after combining the results of the two sensors and determining distance traversed, each wheel should indicate identical distance traversed if the vehicle is traversing a straight line.

Calibration of the differential odometer in modern navigation systems is a manual process. Also it is done with the intervention of a vehicle operator. The conventional method for calibrating wheel sensors requires that an operator drive the vehicle over a straight path, carefully indicating to his navigation system when he comes to the start and finish points on the path. The system can count the number of pulses received from each wheel sensor between the start and finish points, and calculate the distance traversed per pulse for each wheel. Then, the system can scale the output of each wheel sensor such that the resulting distance traversed and heading indications are corrected, or calibrated for inherent errors.

This conventional calibration method is prone to operator errors, and it is not always possible for the operator to find a straight path having a known length with easily discernible start and finish points. Further, if the path is incorrectly measured, or if the operator did not properly align the vehicle on the path before indicating the start of the path, incorrect calibration may result.

Also, with aging of the system and its components, or with changing environmental operating conditions, the erroneous behavior of the wheel sensors is dynamic. For instance this may include a difference of tire size because of a slow leak or misbalanced inflation. Similarly, if an operator changes to his smaller spare the differential odometer will be inaccurate. This may be important to an operator who wants to find a service facility while relying on his navigation system. Since these errors can be substantial, without dynamic, or continuous, calibration, the vehicle heading, thereby the dead reckoned position can be substantially erroneous.

What is needed is a more accurate, and robust differential odometer calibration method that is continuous and automatic in nature.

BRIEF DESCRIPTION OF THE DRAWINGS

FIG. 1 shows a vehicle having a pair of wheels and illustrates the track, or distance, between the wheels;

FIG. 2 shows an equation describing vehicle delta heading in terms of wheel distance traversed and track;

FIG. 3 shows an equation describing $\Delta$ vehicle distance traversed in terms of wheel distance traversed and track;

FIG. 4 shows an error component of vehicle heading as viewed in terms of distance traversed;

FIG. 5 shows a system for executing a method for providing a dynamic calibration of differential odometer related variables in accordance with the invention;

FIG. 6 shows an equation for determining $\Delta$ vehicle heading dependent on variables considered in the method described herein;

FIG. 7 shows an equation used in a filtering method in accordance with the invention;

FIG. 8 shows a histogram of a variable $Y(n)$ dependent on vehicle distance traversed;

FIG. 9 shows an equation for determining a full correction ratio in accordance with the invention;

FIG. 10 shows an equation for determining a diluted correction ratio in accordance with the invention;

FIG. 11 shows an equation for determining a corrected $\Delta$ vehicle heading in accordance with the invention;

FIG. 12 shows an equation for determining a corrected $\Delta$ vehicle distance traversed in accordance with the invention; and FIG. 13 shows a detailed flow chart representing the firmware programmed into the apparatus shown in FIG. 6 in accordance with the invention.

DETAILED DESCRIPTION OF A PREFERRED EMBODIMENT

In a preferred embodiment, a method, and a corresponding apparatus, for continuously calibrating a differential odometer of a vehicle is presented. The differential odometer includes a left wheel sensor coupled to a left wheel, and a right wheel sensor coupled to a right wheel. The left wheel sensor provides a left wheel pulse count as the left wheel rotates. A left wheel distance traversed is determined by a product of the left wheel pulse count and a left distance per pulse coefficient. The right wheel sensor provides a right wheel pulse count as the right wheel rotates. A right wheel distance traversed is determined by a product of the right wheel pulse count and a right distance per pulse coefficient. A vehicle heading, and vehicle distance traversed, are determined using the left wheel distance traversed and the right wheel distance traversed.

Principally, a change in the relationship, preferably a ratio, of the number of pulses provided by respective left and right wheel sensors as the vehicle traverses is observed. If this ratio is dynamically changing, as it would during vehicle maneuvers, then their will be no attempt to calibrate, or correct, the differential odometer. If this ratio is substantially static, then the vehicle is either traversing in a straight line, or along a substantially large arc. It is when this behavior is observed that calibration, or correction, of the differential odometer is performed. When a calibration, or correction, is performed it is accomplished by effecting the distance per pulse value associated with each wheel. For example, a new left distance per pulse coefficient, and a new right distance per pulse coefficient, are substituted for the current left wheel distance per pulse and right wheel distance per pulse coefficients respectively, wherein both new coefficients correspond to the provided calibration, or correction value. This substitution causes calibration of the differential odometer, consistent with the provided correction value. By simultaneously effecting both wheels a vehicle heading error will not be introduced.

Additionally, an autonomous indication of vehicle heading may be used to effect the intensity of the calibration, or correction, in order to dilute the effect of, or gate, the calibration, or correction process. This autonomous provision of vehicle heading enables the detection of traversal along a substantially large arc. When this behavior is detected the calibration, or correction may be diluted or disabled altogether.

Further, an indication of differential odometer sanity, for instance the sanity of the current distance per pulse values associated with the respective wheels may be used to effect the intensity of the calibration, or correction, in order to not dilute the effect of, the calibration, or correction process. Differential odometer insanity may be expected for various reasons. If this behavior is observed the calibration, or correction process is applied with full intensity in order to resolve the insanity.

This continuous calibration provides a more accurate and robust vehicle heading while not adversely effecting the vehicle distance traversed.

Referring to FIG. 1 a vehicle 101 is illustrated having a left wheel 103 and a right wheel 105, and illustrates a track distance 107, between the wheels 103, 105. This track distance 107 is later used to determine vehicle heading and distance traversed values.

FIG. 2 shows an equation describing vehicle $\Delta$ heading in terms of wheel distance traversed and track distance. Since a differential odometer provides for an incremental indication of vehicle position, rather than an absolute indication headings and distances are viewed in terms of $\Delta$'s. Sometimes, for convenience in this disclosure, the $\Delta$'s are not specified but are meant to be inherent to the discussion. Specifically, the $\Delta$ heading 201 is determined by subtracting a right distance traversed 205 from a left distance traversed 203, and dividing by a known track distance 207.

FIG. 3 shows an equation describing vehicle $\Delta$ distance traversed by the vehicle 101 in terms of left distance traversed 203 and right distance traversed 205 divided by two 303. The equation shown in FIG. 3 actually determines an average vehicle distance traversed. This is convenient because if a vehicle traverses a pothole, or other road surface aberration relying on a non averaged relationship will be too erroneous.

It is commonly known, by those skilled in the art, that because of the relationships shown in the former equations that an error component may be present in the vehicle $\Delta$ heading if the distance traversed by either or both wheels carries an error. An example of this is readily seen if the vehicle 101 is traversing a straight line, as illustrated in FIG. 4.

FIG. 4 shows this error component of the vehicle heading as viewed in terms of distance traversed.

To provide a solution to this problem a new method, with its corresponding apparatus, as shown in FIG. 5 has been devised.

FIG. 5 shows an apparatus for executing the method for providing a dynamic, or continuous, calibration of the differential odometer related values, or variables. Element 501 is a gear tooth wheel coupled to the left wheel 103 of the vehicle. Element 503 is an inductive sensor used to sense the rotation of the left wheel 103 and the corresponding rotation of the gear tooth wheel 501. Sensor 503 emits a signal 505, in the form of electrical pulses corresponding to the rotational movement of the left wheel 103. This signal 505 is coupled to an input 507 of a microcontroller 509. Correspondingly, a right wheel 105 has a gear tooth wheel 511 coupled to it. An inductive sensor 513 is used to sense the rotation of the right wheel 105. This sensor 513 also emits a signal 515, in the form of electrical pulses corresponding to the rotational movement of the right wheel 105. This signal 515 is coupled to an input 517 of the microcontroller 509. The method described herein is not reliant on, or limited to, the exact configuration and type of the wheel sensors. Those skilled in the art will recognize many other, equivalent wheel sensing architectures.

In the preferred embodiment a Motorola MC68HC11 microcontroller is used as the microcontroller 509. This microcontroller 509 embodies specific facilities, in the form of programmable counters to convert the electrical pulses 505, 517 into a left wheel pulse count and a right wheel pulse count as the respective wheels rotate. Conveniently, the Motorola MC68HC11 microcontroller has integral facility for storing program instructions in its read only memory.

A compass 531, provides a vehicular heading 533 autonomous to a heading determined by the differential odometer. This heading 533 is input into the microcontroller 509. The use of this autonomously developed heading will be described later. The microcontroller 509 also has an output 519 that provides a continuously corrected vehicle heading and vehicle distance traversed 529 to a display module 535. Of course, the display module 535 may be substituted by another device that has use for these continuously corrected values or parameters.

The microcontroller 509 is,programmed in accordance with the method, later described in flow chart form, illustrated in FIG. 13.

To understand precisely how the present invention works, several additional figures are presented as follows.

FIG. 6 shows an equation for determining a $\Delta$ vehicle heading 201' dependent on an Lcnt 603, or a left wheel pulse count, a Ldpp 605, or a left, wheel, distance per pulse coefficient, an Rcnt 607, or a right wheel pulse count, an Rdpp 609, or a right distance per pulse coefficient, and track 207. This equation represents further detail of an earlier presented equation from FIG. 2. The Ldpp 605, and Rddp 609 represent the values that will be continuously modified in the present method to calibrate the differential odometer.

FIG. 7 shows an equation used in filtering steps integral to the preferred embodiment. It is used to determine a relationship, in this case a correction ratio determined by adding an Rcnt 607 divided by a constant, in this case 2,000 to the product of the last sample of the correction ratio Y(n−1) 703 by one minus the ratio of Lcnt 603 divided by the constant 2,000 705. The constant 2,000 705 is used later to ensure that a particular distance as been traversed before the correction takes place. Those skilled in the relevant art will recognize other constants to accomplish the same result. The terms Lcnt 603 and Rcnt 607 in this equation represent the number of pulses counted per each wheel respectively since Y(n−1) was determined.

FIG. 8 shows a histogram of the correction ratio Y(n) 701 dependent on vehicle distance traversed 803. It is interesting to note several aspects of this histogram because of the discussion to follow. Reference numbers 805, 807, and 809 are showing various positive and negative peaks representing the determined correction ratio, or actually the lateral acceleration, of the differential odometer. While the determined correction ratio shows this behavior the differential odometer is not calibrated. Reference number 811 shows a substantially stable period of the histogram with little lateral acceleration. This substantially stable period is important to note for the later discussion because it is during this behavior that the differential odometer is calibrated.

FIG. 9 shows an equation for determining an FRC 901, or a full correction ratio representing the correction ratio Y(n) 701.

FIG. 10 shows an equation for determining a DRC 1001, or diluted correction ratio subject to an assignment of an intensity to bias the correction ratio Y(n) 701 when certain autonomous indications of vehicle parameters regarding the differential odometer performance are taken into account as described later. In this equation, a ratio of Ldpp(old) 605' and Rdpp(old) 609' is added to the ratio of Y(n) 701, minus the ratio of Ldpp(old) 605' and Rdpp(old) 609' divided by a constant, in this case 8 1003. Ldpp(old) 605' and Rdpp(old) 609' represent the most recent samples of the left distance per pulse and right distance per pulse coefficients respectively. Note that the method presented is a sampled system that continuously measures behaviors of relationships of various parameters, or values before the differential odometer is corrected. As mentioned earlier, it relies on the fact that vehicles are mostly traversing in a substantially straight line. If the behavior of the ratio of Y(n) 701 indicates this, then the differential odometer will be calibrated.

FIG. 11 shows an equation for determining a corrected Δ vehicle heading 601' that uses, in this case a full ratio correction, FRC 901 for determining the corrected Ldpp 605 and also for determining a corrected Rdpp 609. The reason for including both a new Rddp, Rdpp(new) 1101, and a new Ldpp, Ldpp(new), is so that the average of the distance traversed is not imbalanced during the correction process. To determine a corrected Δ vehicle heading 601' first the Rdpp(new) is determined. This process takes the last sampled Ldpp, or Ldpp(old) 605' and divides it by the FRC 901, adds this result to Rdpp(old) and divides it by a constant 2, 1003. This Rdpp(new) 1101 is then substituted into the Δ vehicle heading equation for Rdpp 609. Then an Ldpp(new) 1105 is determined as a product of Rdpp(new) 1101' and FRC 901, and substituted for Ldpp 605. It is with these determinations and substitutions that the differential odometer is calibrated. Later, in FIG. 13 the DRC 1001 will be considered instead of the FRC 901.

FIG. 12 shows an equation for determining a corrected Δ vehicle distance traversed that uses, in this case a full ratio correction, FRC 901 for determining the corrected Ldpp 605 and also for determining a corrected Rdpp 609. As mentioned above, the reason for including both a new Rddp, Rdpp(new) 1101, and a new Ldpp, Ldpp(new), is so that the average of the distance traversed is not imbalanced during the correction process. To determine a corrected Δ distance traversed 1201, the same determination shown above is used. Actually, the Rdpp(new) 1101 and Ldpp(new) 1105 are determined continuously and substituted for the Rdpp 609, and Ldpp 605 values continuously. Then the Δ vehicle heading 601' and the Δ distance traversed 1201 are determined using these substituted values.

FIG. 13 shows a detailed flow chart representing the firmware programmed into the apparatus shown in FIG. 6.

This routine is executing continuously. Its purpose is to wait until a certain distance is traversed while heading remains substantially constant, then provide a new calibration based on a determined error. In step 1301 the right and left odometers are read. This includes determining the current Lcnt and the current Rcnt. In step 1303 the heading, or Δ vehicle heading, and the vehicle distance traversed, or Δ distance traversed are determined by the microcontroller 509 using the equations set forth in FIGS. 11 and 12. Then in step 1305 a new estimate of the relationship, or ratio between the newly acquisitioned Rcnt and Lcnt is determined by the microcontroller 509 using the equation set forth in FIG. 7. As mentioned earlier, it is presumed that the vehicle is usually traversing in a substantially straight line for most of the time. Steps 1305-1321 are to ensure this behavior is recognized before the differential odometer is newly calibrated. This behavior is recognized by determining that a predetermined vehicle distance has been traversed while the measured ratio is bounded within a predetermined range for a predetermined vehicle distance traversed. Step 1305 is a filter for smoothing out minor changes in the ratio. Of course, those skilled in the relevant art will recognize many other, equivalent methods of accomplishing the same result.

In step 1307 a distance totalizer is incremented by an amount representing the distance traversed since the previous iteration. Note that the distance totalizer is simply a variable in the microcontroller's 509 memory. In step 1309 the distance totalizer is tested to determine if 100 meters have been traversed. If this test 1309 determines that 100 meters hasn't been traversed, then the routine returns to execute step 1301. If this test 1309 determines that 100 meters has been traversed, then the next step is executed.

In step 1311 a sample counter is incremented. Note that the sample counter is also a variable in the microcontroller's 509 memory.

the next step 1313, a test is executed to determine if this was the first sample, or in effect, the first time through the sample loop. If it was the first sample, step 1315 is executed.

In step 1315 Y(n) 701 is stored representing the first determined ratio. Additionally, a first compass heading is read from the compass 531 and stored for a later operation.

If it was not the first sample, step 1317 is executed. In step 1317 Y(n) 701 is tested to determine if it is bounded within a predetermined range of the first ratio stored in step 1315. In this case a constant 0.001, representing the predetermined range, is used.

If Y(n) is not within 0.001 of the first ratio stored in step 1315, then there was too much lateral acceleration detected and step 1319 will be executed. In step 1319 the sample counter, and the distance totalizer are cleared. This action will, in effect, start the filtering process over.

If Y(n) is within 0.001 of the first ratio stored in step 1315, then the vehicle was determined to be traversing in a substantially straight line and step 1321 is executed. In step 1321 a test is executed to determine if this is the sixth sample, or in effect, if the vehicle has traversed 100 meters six consecutive times while the correction ratio Y(n) has not deviated substantially from, in effect, straight line behavior. If it isn't the sixth sample then the filter loop is repeated starting at step 1301.

If the test in step 1321 determines that this was the sixth sample, or in effect a straight line behavior was observed for 600 meters, then step 1323 is executed.

Steps 1323–1329 are included in order to consider a biasing, or adding a level of intensity to be applied to the forthcoming updated left distance per pulse coefficient and right distance per pulse coefficient. This is accomplished by considering either a sanity of the differential odometer, through a non-indigenous process, or by measuring a parameter, such as heading, from an autonomous process. Of course those skilled in the relevant art may consider other, in effect, equivalent methods of autonomously determining a parameter associated with an expected performance of the differential odometer. One such suggestion is to employ map matching to determine if a road segment the vehicle is traversing is straight.

Kozikaro, in U.S. Pat. No. 5,058,023, entitled VEHICLE POSITION DETERMINING APPARATUS, teaches determination of excessive lateral acceleration which, in effect, is a measure of the sanity of the differential odometer. If the differential odometer is consider sane, or within the range physically possible in the vehicle, then an adjusted, in this case diluted, or reduced correction value, or ratio is provided by adjusting the intensity of the correction value. This is done by applying the equation shown in FIG. 10 to compute the correction ratio. To consider the sanity of the differential odometer the right wheel pulse count and the left wheel pulse count are used.

In the preferred embodiment the use of an autonomously determined heading is demonstrated. Returning to FIG. 13, in step 1323 the current heading for the compass 531 is read.

Then, in step 1325, a test is executed to determine if this compass heading is within a predetermined range, in this case 5 degrees of the lastly measured, in this case the first compass heading. If it is within 5 degrees, then the observed behavior indicates that the vehicle is traversing on a straight line and step 1327 is executed. Of course, those skilled in the art may recognize many other, in effect equivalent methods and apparatus to substitute for the compass to gain this advantage over the prior art.

In step 1327 the intensity of the correction ratio is set to full, or in effect increased, by executing the equation earlier described in FIG. 9.

If the compass heading is not within 5 degrees of the lastly measured compass heading then step 1329 is executed. This, in effect, means that the observed behavior indicates that the vehicle is traversing a curved path, and step 1329 is executed.

In step 1329 the intensity of the correction ratio is set to diluted, or in effect decreased, by executing the equation earlier described in FIG. 10. This is important to note, because without this diluting effect error would be added to the differential odometer, because, in effect, this process, without the aid of another process, or autonomously provided heading, cannot distinguish between traversing on a straight line path or on a curved path. Substantially long distances may be traversed on a curved path. One example is traversing a structure such as a mountain, wherein a vehicle may be constantly traversing in an arced or curved path. By providing for recognition of this behavior and the active dilution, or reduction in the correction effect, error, due to this effect will substantially be negated.

Returning to FIG. 13, in step 1331, the new calibration values are determined. This is accomplished by determining a new left distance per pulse coefficient, or Ldpp(new), and a new right distance per pulse coefficient, or Rdpp(new), both corresponding to the provided revised correction ratio from either step 1327 or step 1329. Then substituting the left distance per pulse coefficient, or Ldpp 605 with the new left distance per pulse coefficient, and the right distance per pulse coefficient 609 with the new right distance per pulse coefficient, thereby causing calibration of the differential odometer, consistent with the provided revised correction ratio. This determination and substitution is shown in both FIGS. 11 and 12 as a new Ldpp, or Ldpp(new) 1105 is determined and substituted for the existing Ldpp 605, and a new Rdpp, or Rdpp(new) 1101 is determined and substituted for the existing Rdpp 609.

Then step 1333 is executed, clearing the sample counter so that the filter may start anew. This automated process has taken the burden away from a vehicle operator to correct for errors in her differential odometer. This is a significant advantage over the prior art. The method of determining both new left and new right calibrations leads to not introducing error in the average distance traversed determination, shown by the equation in FIG. 12. This is also a significant feature of this method.

Although a method is described in the preferred embodiment, those skilled in the art will recognize that many equivalent apparatus embodiments are also possible.

In conclusion, a dynamic method for continuously calibrating a differential odometer of a vehicle is presented. This continuous calibration provides more accurate and robust values for vehicle heading and vehicle distance traversed that overcome the deficiencies of the prior art. Since calibration is continuously performed the accuracy of the vehicle heading can be substantially error-free, without adversely affecting the vehicle distance traversed. Additionally, the automatic nature of the process eliminates operator errors and the other dynamic and environmental causes for error.

What is claimed is:

1. A method for continuously calibrating a differential odometer of a vehicle, said vehicle having a left wheel and a right wheel, wherein the left wheel is located a known track distance opposite the right wheel, said differential odometer including a left wheel sensor coupled to the left wheel, and a right wheel sensor coupled to the right wheel, said left wheel sensor providing a left wheel pulse count as the left wheel rotates, wherein left wheel distance traversed is determined by a product of the left wheel pulse count and a left distance per pulse coefficient, and said right wheel sensor providing a right wheel pulse count as the right wheel rotates, wherein right wheel distance traversed is determined by a product of the right wheel pulse count and a right distance per pulse coefficient, wherein vehicle heading, and vehicle distance traversed are determined using the left wheel distance traversed and the right wheel distance traversed, said method comprising the steps of:

provide a correction value corresponding to a measured relationship between the left wheel pulse count and the right wheel pulse count;

determining a new left distance per pulse coefficient, corresponding to the provided correction value, and a new right distance per pulse coefficient, corresponding to the provided correction value; and substituting the left distance per pulse coefficient with the new left distance per pulse coefficient, and the right distance per pulse coefficient with the new right distance per pulse coefficient, thereby causing calibration of said differential odometer, consistent with the provided correction value.

2. A method in accordance with claim 1 wherein said measured relationship between the right wheel pulse count and the left wheel pulse count is bounded within a predetermined range for a predetermined vehicle distance traversed before the correction value is provided.

3. A method in accordance with claim 2 wherein said measured relationship is continuously bounded within a predetermined range for a predetermined continuous vehicle distance traversed.

4. A method in accordance with claim 1 wherein said measured relationship between the right wheel pulse count and the left wheel pulse count corresponds to a ratio between the right wheel pulse count and the left wheel pulse count.

5. A method in accordance with claim 2 wherein said measured relationship between the right wheel pulse count and the left wheel pulse count corresponds to a ratio between the right wheel pulse count and the left wheel pulse count.

6. A method in accordance with claim 1 further comprising a step of determining an accuracy of the relationship measured between the left wheel pulse count and the right wheel pulse count, by a process autonomous to the step of providing a correction value corresponding to the measured relationship, and for adjusting an intensity of said correction value dependent on the determined accuracy.

7. A method in accordance with claim 6 wherein said step of determining the accuracy of the measured relationship of the left wheel pulse count and the right wheel pulse count comprises a step of measuring a vehicle heading.

8. A method in accordance with claim 7 wherein said step of measuring a vehicle heading further comprises a step of adjusting the intensity of the correction value in accordance with the measured vehicle heading.

9. A method in accordance with claim 8 wherein said step of measuring a vehicle heading comprises measuring a vehicle heading from a compass.

10. A method in accordance with claim 9 wherein said step of adjusting the intensity of the correction value includes decreasing the intensity of the correction value responsive to the measured vehicle heading.

11. A method in accordance with claim 6 wherein said step of determining an accuracy of the measured relationship comprises a step of determining a level of sanity of the right wheel pulse count and the left wheel pulse count and adjusting the intensity of the correction value in accordance with the determined level of sanity.

12. A method in accordance with claim 11 wherein said step of adjusting the intensity of the correction value includes increasing the intensity of the correction value responsive to a low level of said determined sanity.

13. A method for continuously calibrating a differential odometer of a vehicle, said vehicle having a left wheel and a right wheel, wherein the left wheel is located a known track distance opposite the right wheel, said differential odometer including a left wheel sensor coupled to the left wheel, and a right wheel sensor coupled to the right wheel, said left wheel sensor providing a left wheel pulse count as the left wheel rotates, and said right wheel sensor providing a right wheel pulse count as the right wheel rotates, said method comprising the steps of:

determining vehicle heading and vehicle distance traversed using a product of the left wheel pulse count and a left distance per pulse coefficient and a product of the right wheel pulse count and a right distance per pulse coefficient;

providing a correction value corresponding to a measured ratio of the right wheel pulse count to the left wheel pulse count, when a predetermined another vehicle distance has been traversed while said measured ratio is bounded within a predetermined range for a predetermined vehicle distance traversed;

determining a new left distance per pulse coefficient, corresponding to the provided correction value, and a new right distance per pulse coefficient, corresponding to the provided correction value; and substituting the left distance per pulse coefficient with the new left distance per pulse coefficient, and the right distance per pulse coefficient with the new right distance per pulse coefficient, thereby causing calibration of said differential odometer, consistent with the provided correction value.

14. A method in accordance with claim 13 wherein said measured ratio is continuously bounded within a predetermined range for a predetermined continuous vehicle distance traversed.

15. A method in accordance with claim 14 further comprising a step of determining correctness of said measured relationship of the left wheel pulse count and the right wheel pulse count by a process autonomous to the step of providing a correction value and providing an intensity of said correction value dependent on the determined correctness.

16. A method in accordance with claim 15 wherein said step of determining correctness of said measured relationship of the left wheel pulse count and the right wheel pulse count by a process autonomous to the step of providing a correction value comprises a step of measuring a vehicle heading.

17. A method in accordance with claim 16 wherein said step of measuring a vehicle heading, autonomous to the differential odometer process further comprises a step of adjusting the intensity of the correction value in accordance with the measured vehicle heading.

18. A method in accordance with claim 17 wherein said step of adjusting the intensity of the correction value includes decreasing the intensity of the correction value responsive to the measured vehicle heading.

19. A method in accordance with claim 18 wherein said step of measuring a vehicle heading comprises measuring a vehicle heading from a compass.

20. A method in accordance with claim 19 wherein said step of determining correctness of the measured relationship comprises a step of determining a level of sanity of the right wheel pulse count and the left wheel pulse count and adjusting the intensity of the correction value in accordance with the determined level of sanity.

21. A method in accordance with claim 20 wherein said step of adjusting the intensity of the correction value includes increasing the intensity of the correction value responsive to a low level of said determined sanity.

22. A method for calibrating a differential odometer of a vehicle, said vehicle having a left wheel and a right wheel, wherein the right wheel is located a known track distance opposite the left wheel, said differential odometer including a left wheel sensor coupled to the left wheel, and a right wheel sensor coupled to the right wheel, said sensors for providing electrical pulses as the associated wheel rotates, said sensors for determining, vehicle heading and vehicle distance traversed, said method comprising the steps of:

counting the electrical pulses provided by each wheel and periodically providing a left wheel pulse count corresponding to a totalized number of electrical pulses provided by the left wheel sensor within a period, and periodically providing a right wheel pulse count corresponding to a totalized number of electrical pulses provided by the right wheel sensor within said period;

determining said vehicle heading by dividing a difference of a product of the left wheel pulse count and a left distance per pulse coefficient and a product of the right wheel pulse count and a right distance per pulse coefficient by the track distance;

determining said vehicle distance traversed by dividing a sum of the product of the left wheel pulse count and the left distance per pulse coefficient and the right wheel pulse count and the right distance per pulse coefficient by two;

filtering the right wheel pulse count and the left wheel pulse count and providing a correction ratio corresponding to a measured ratio of the right wheel pulse count to the left wheel pulse count, when a predetermined vehicle distance has been traversed while said measured ratio is bounded within a predetermined range for a predetermined vehicle distance traversed;

determining a new left distance per pulse coefficient for the left wheel corresponding to the provided correction ratio, and a new right distance per pulse coefficient for the right wheel corresponding to the provided correction ratio; and substituting the left distance per pulse coefficient with the new left distance per pulse coefficient, and the right distance per pulse coefficient with the new right distance per pulse coefficient, thereby causing calibration of said differential odometer, consistent with the provided correction ratio.

23. A method in accordance with claim 22 wherein said measured ratio is continuously bounded within a predetermined range for a predetermined continuous vehicle distance traversed.

24. A method in accordance with claim 23 further comprising a step of determining an accuracy of the measured ratio between the left wheel pulse count and the right wheel pulse count, by a process autonomous to the step of providing a correction ratio corresponding to the measured relationship, and for adjusting an intensity of said correction ratio dependent on the determined accuracy.

25. A method in accordance with claim 24 wherein said step of determining the intensity of the correction ratio includes increasing the intensity of the correction ratio responsive to the vehicle heading measured in said step of measuring a heading using a to be provided compass, and the vehicle heading.

26. A method for continuously calibrating a differential odometer of a vehicle, said vehicle having a left wheel and a right wheel, wherein the left wheel is located a known track distance opposite the right wheel, said differential odometer including a left wheel sensor coupled to the left wheel, and a right wheel sensor coupled to the right wheel, said method comprising the steps of:

providing a left wheel pulse count as the left wheel rotates, wherein a left wheel distance traversed is determined by a product of the left wheel pulse count and a left distance per pulse coefficient;

providing a right wheel pulse count as the right wheel rotates, wherein a right wheel distance traversed is determined by a product of the right wheel pulse count and a right distance per pulse coefficient;

determining vehicle heading by dividing a difference of the left wheel distance traversed and the right wheel distance traversed by the track distance;

determining a vehicle distance traversed by dividing the sum of the left wheel distance traversed and the right wheel distance traversed by two;

filtering the right wheel pulse count and the left wheel pulse count and providing a correction ratio corresponding to a measured ratio of the right wheel pulse count to the left wheel pulse count, when a predetermined continuous vehicle distance has been traversed while said measured ratio is continuously bounded within a predetermined range for a predetermined vehicle distance traversed;

determining an autonomous vehicle heading using a to be provided compass;

determining an intensity of the correction ratio responsive to a measured relationship between the determined vehicle heading and the autonomously determined vehicle heading, and providing a revised correction ratio corresponding to the provided ratio and the determined intensity;

determining a new left distance per pulse coefficient, corresponding to the provided revised correction ratio, and a new right distance per pulse coefficient, corresponding to the provided revised correction ratio; and substituting the left distance per pulse coefficient with the new left distance per pulse coefficient, and the right distance per pulse coefficient with the new right distance per pulse coefficient, thereby causing calibration of said differential odometer, consistent with the provided revised correction ratio.

27. An apparatus for continuously calibrating a differential odometer of a vehicle, said vehicle having a left wheel and a right wheel, wherein the left wheel is located a known track distance opposite the right wheel, said differential odometer including a left wheel sensor coupled to the left wheel, and a right wheel sensor coupled to the right wheel, said left wheel sensor providing a left wheel pulse count as the left wheel rotates, wherein a left wheel distance traversed is determined by a product of the left wheel pulse count and a left distance per pulse coefficient, and said right wheel sensor providing a right wheel pulse count as the right wheel rotates, wherein a right wheel distance traversed is determined by a product of the right wheel pulse count and a right distance per pulse coefficient, wherein vehicle heading is determined using the left wheel distance traversed and the right wheel distance traversed, and wherein vehicle distance traversed is determined by the left wheel distance traversed and the right wheel distance traversed, said apparatus comprising:

means for providing a correction value corresponding to a measured relationship between the left wheel pulse count and the right wheel pulse count;

means for determining a new left distance per pulse coefficient, corresponding to the provided correction value, and a new right distance per pulse coefficient, corresponding to the provided correction value; and means for substituting the left distance per pulse coefficient with the new left distance per pulse coefficient, and the right distance per pulse coefficient with the new right distance per pulse coefficient, thereby causing calibration of said differential odometer, consistent with the provided correction value.

28. An apparatus in accordance with claim 27 wherein said measured relationship between the right wheel pulse count and the left wheel pulse count corresponds to a ratio between the right wheel pulse count and the left wheel pulse count.

29. An apparatus in accordance claim 28 further comprising means for determining correctness of said measured relationship of the left wheel pulse count and the right wheel pulse count independent of the differential odometer and providing an intensity of said correction value.

30. An apparatus in accordance claim 29 wherein said means for determining correctness of said measured relationship of the left wheel pulse count and the right wheel pulse count comprises means for measuring a vehicle heading and adjusting the intensity of the correction value in accordance with the measured vehicle heading.

31. An apparatus for continuously calibrating a differential odometer of a vehicle, said vehicle having a left wheel and a right wheel, wherein the left wheel is located a known track distance opposite the right wheel, said differential odometer including a left wheel sensor coupled to the left wheel, and a right wheel sensor coupled to the right wheel, said left wheel sensor providing a left wheel pulse count as the left wheel rotates, and said right wheel sensor providing a right wheel pulse count as the right wheel rotates, said apparatus comprising:

means for determining vehicle heading using a product of the left wheel pulse count and a left distance per pulse coefficient and a product of the right wheel pulse count and a right distance per pulse coefficient;

means for determining a vehicle distance traversed using a product of the left wheel pulse count and a left distance per pulse coefficient and a product of the right wheel pulse count and the right distance per pulse coefficient;

means for providing a correction ratio corresponding to the ratio of the right wheel pulse count to the left wheel pulse count, when a predetermined vehicle distance has been traversed while said measured correction ratio is bounded within a predetermined range for a predetermined vehicle distance traversed;

means for determining a new left distance per pulse coefficient, corresponding to the provided correction ratio, and a new right distance per pulse coefficient, corresponding to the provided correction ratio; and means for substituting the left distance per pulse coefficient with the new left distance per pulse coefficient, and the right distance per pulse coefficient with the new right distance per pulse coefficient, thereby causing calibration of said differential odometer, consistent with the provided correction ratio.

32. An apparatus in accordance with claim 31 wherein said correction ratio between the right wheel pulse count and the left wheel pulse count corresponds to a ratio between the right wheel pulse count and the left wheel pulse count.

33. An apparatus in accordance with claim 32 further comprising means for determining correctness of said correction ratio of the left wheel pulse count and the right wheel pulse count independent of the differential odometer and providing an intensity of said correction ratio.

34. An apparatus in accordance with claim 33 wherein said means for determining correctness of said correction ratio of the left wheel pulse count and the right wheel pulse count comprises means for measuring said vehicle heading.

35. An apparatus in accordance with claim 34 further comprising means for adjusting the intensity of the correction ratio in accordance with the measured vehicle heading.

* * * * *